Feb. 26, 1957  W. T. JOCHUM ET AL  2,782,626
ANGLE MEASURING AND CORRECTING MEANS
Filed June 20, 1952  4 Sheets-Sheet 1

INVENTORS
WILLIAM T. JOCHUM
EDGAR B. ROMBERG
BY RALPH H. OSTERGREN

*William R. Lane*
ATTORNEY

INVENTORS
WILLIAM T. JOCHUM
EDGAR B. ROMBERG
RALPH H. OSTERGREN

BY William R Lane
ATTORNEY

Feb. 26, 1957 W. T. JOCHUM ET AL 2,782,626
ANGLE MEASURING AND CORRECTING MEANS
Filed June 20, 1952 4 Sheets-Sheet 4
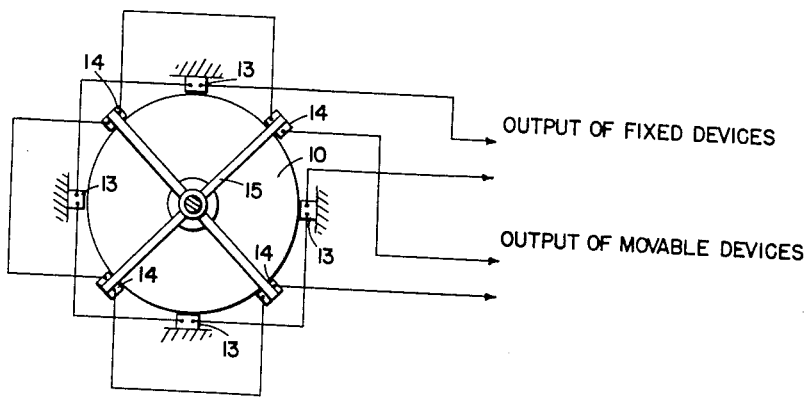
FIG. 7
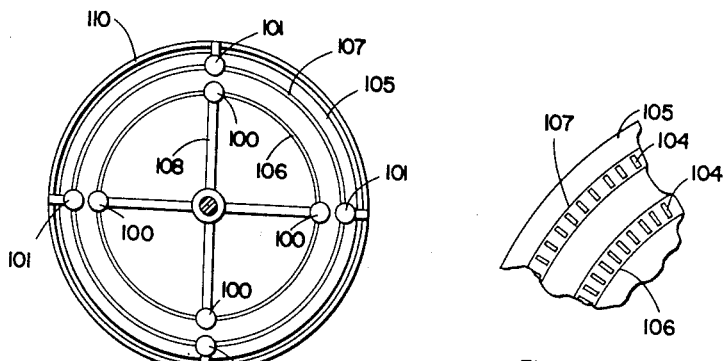
FIG. 9
FIG. 10
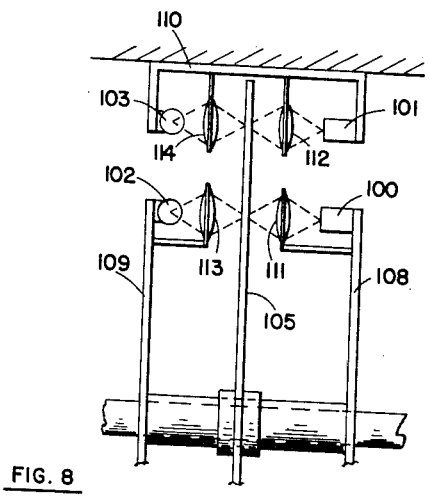
FIG. 8
*INVENTORS*
WILLIAM T. JOCHUM
EDGAR B. ROMBERG
BY RALPH H. OSTERGREN
*William R. Lane*
ATTORNEY

United States Patent Office 2,782,626
Patented Feb. 26, 1957

2,782,626

ANGLE MEASURING AND CORRECTING MEANS

William T. Jochum, Glendale, Edgar B. Romberg, Whittier, and Ralph H. Ostergren, Fullerton, Calif., assignors to North American Aviation, Inc.

Application June 20, 1952, Serial No. 294,744

15 Claims. (Cl. 73—1)

This invention pertains to a device which precisely measures an angle, compares the measured angle with a desired angle, and records the deviation between the measured and desired angle, or generates a cam to cause the two angles to coincide.

This invention may be particularly applied to measure the difference between an angle through which the driven shaft of a precision gear drive has turned and the predetermined angle through which the driven shaft should have turned, together with means which generate a cam which may be used to reduce the difference substantially to zero. The device contemplated by this invention has other particular application for measuring and correcting precision angles: to point an astronomical telescope, to calibrate a precision angle dividing head, to calibrate a precision worm gear, to calibrate a precision rack gear, and to calibrate a master gear.

It is extremely difficult to fabricate precision gears so that when several gears are meshed together the angular rotation of one gear is a linear function of the angular rotation of another gear. Prior to this invention the best means for measuring the errors in a gear or a combination of gears were optical angle measuring means. The use of this means is very slow and tedious. The device contemplated by this invention automatically measures and corrects the errors in the gears in a short period of time with a minimum of human supervision. This invention uses a series of indicia uniformly spaced about a circle upon a rotating structure such as a disc or drum. The structure is rotated rapidly relative to means for detecting the movement of the indicia. The movement of the indicia generates a signal in the detecting means. Two assemblies of detecting means are provided. One assembly remains stationary, while the other assembly turns about the axis of rotation of the structure relative to the first assembly. The rapid rotation of the structure causes electrical signals to be generated in the detecting means. These signals are transmitted to electronic amplifiers. The electronic amplifiers have a smoothing effect on the signal and cause the signal to conform to the shape of a sinusoid and with a substantially constant average frequency. The average difference in phase between the signal induced in the stationary assembly and the signal induced in the rotatable assembly represents the angle through which the rotatable assembly has turned. The electrical phase difference is measured and is used to make a calibration curve or a cam.

The series of indicia may be uniformly-spaced mechanical markings upon the rotatable structure, uniformly-spaced mirrors upon the rotatable structure, a uniformly-spaced series of magnetic impressions impressed within a magnetizable material upon the surface of a rotatable structure, a sinusoidal magnetic signal impressed within the magnetic material upon the surface of the rotatable structure, a series of very small slits cut in a circle upon the rotatable structure and centered upon the axis of rotation of the structure, or any other uniformly distributed series of indicia and uniformly displaced radially from the axis of the structure.

The detecting means are photoelectric cells or tubes, electromagnetic heads, or similar detecting devices. The photoelectric cells are used in conjunction with a suitable light source.

In the preferred embodiment of this invention, a sinusoidal magnetic track is impressed upon the periphery of a disc or drum, and the detecting means comprises one or more magnetic pick-off heads.

It is therefore an object of this invention to provide means for accurately measuring the angular error in the rotation of a driven shaft relative to a driving shaft.

It is another object of this invention to provide means for comparing the angle through which a driven shaft has turned with the predetermined angle through which it should have turned.

It is another object of this invention to provide means for measuring, calibrating, and correcting the angular error in the rotation of a driven element relative to a driving element where the error is induced by a combination of gears.

It is another object of this invention to provide automatic means for compensating the angular error in precision drives.

It is another object of this invention to provide means for correcting the errors in a rotation.

It is another object of this invention to provide means for calibrating a precision rack gear.

It is another object of this invention to provide means for automatically generating the correction contour of a cam to compensate for angular error in shaft position.

It is another object of this invention to provide means for automatically generating the contour of a cam to compensate for the errors in a lead screw drive.

It is another object of this invention to provide means for automatically generating the correction contour of a cam to compensate for errors in a precision rack gear.

It is another object of this invention to provide means for calibrating a master gear.

It is another object of this invention to provide means for averaging errors in the spacing of an indicia upon a disc or drum which is employed as a fundamental angular reference.

It is another object of this invention to provide means for uniformly spacing a series of indicia upon a rotatable structure.

It is another object of this invention to provide means for uniformly spacing a sinusoidal magnetic track upon a rotatable structure.

It is another object of this invention to provide means for measuring the instantaneous angular velocity of a shaft.

It is another object of this invention to provide means for measuring the instantaneous angular acceleration of a shaft.

Other objects of invention will become apparent from the following description taken in connection with the accompanying drawings, in which:

Fig. 7 is a plan view of means for supporting both the fixed and movable detecting devices of Figs. 1, 2, 3, 4, and 6;

Fig. 8 is a side view of a portion of a rotating disc and photoelectric embodiment of this invention;

Fig. 9 is a plan view of a rotating disc and photoelectric embodiment of this invention;

And Fig. 10 is an enlarged view of the indicia upon the disc of Fig. 9.

Figure 1:
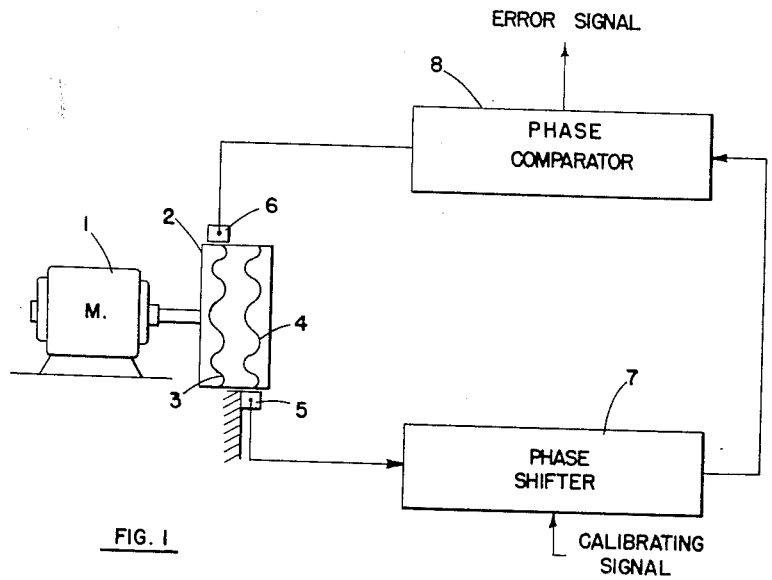
Fig. 1 is a schematic diagram of a basic angle measuring device.
Figure 2:
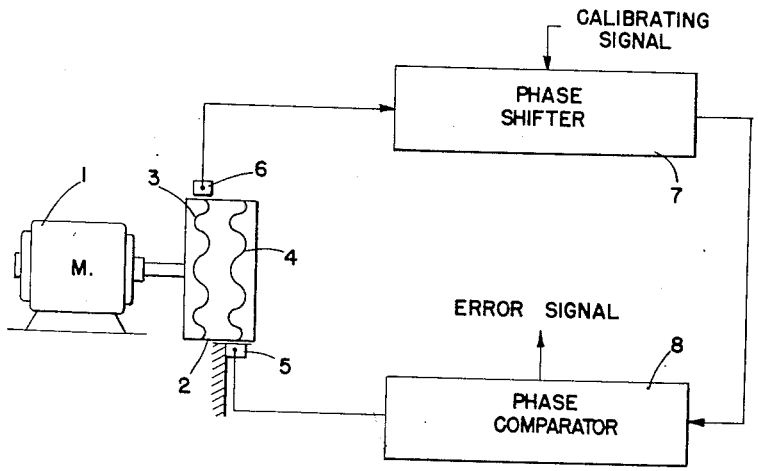
Fig. 2 is a schematic diagram of an alternative angle measuring device.

In Figs. 1 and 2, motor 1 drives rotating structure 2, such as a disc or drum, at a known substantially constant speed. Two sinusoidal magnetic tracks 3 and 4, which are everywhere identical for the same circumferential position, and close exactly and completely on themselves, are impressed upon rotating structure 2. A plurality of stationary detecting devices, such as magnetic heads 5, are positioned uniformly around rotating structure 2, as shown at 13 in Fig. 7, at multiples of the wave length of sinusoidal track 4 so that the signals induced in each of heads 5 will pass through zero at approximately the same time. Only one of the plurality of heads 5 is shown in Figs. 1 and 2. A plurality of movable detecting devices, such as magnetic heads 6, are positioned uniformly around rotating structure 2, as shown at 14 in Fig. 7, at multiples of the wave length of sinusoidal track 3 so that the signals in heads 6 pass through zero at approximately the same time. All of heads 6, of which only one is shown in Figs. 1 and 2, are fastened to a rotating bracket, similar to that shown at 15 in Fig. 7, and which turns through the angle to be measured. A standard reference signal of the desired frequency is generated in heads 5.

In the embodiment shown in Fig. 1, heads 5 are connected in series to phase shifter 7 which shifts the phase of the standard reference signal. The output of phase shifter 7, as well as heads 6, is connected to phase comparator 8 where the phases of the signals are compared. The angle through which it is desired heads 6 should turn is selected. An electrical signal or a shaft rotation which is proportional to the desired rotation of heads 6 is introduced into phase shifter 7. The difference in phase between the signal generated in the heads and the shifted signal from phase shifter 7 is proportional to the difference between the angle through which heads 6 have rotated and the angle corresponding to the command or calibrating signal introduced into phase shifter 7. When movable heads 6 have turned through the required angle, the signal transferred from phase shifter 7 to phase comparator 8 is in phase with the signal from movable heads 6. When movable heads 6 have not turned through the required angle, but the angle through which they have turned differs from the required angle by a small amount δ, the electrical phase angle difference between the signal fed from phase shifter 7 and the signal transferred from heads 6 to phase comparator 8 is equal to nδ where "n" is the total number of complete sinusoids impressed upon track 3 or track 4. The electrical phase difference between the signal from phase shifter 7 and the signal from heads 6 is used to plot a graph of the error in mechanical rotation of the device attached to movable heads 6, or it may be used to control a correction device such as a synchro or a cam-differential arrangement, as hereinafter described.

Alternatively, as shown in Fig. 2, the signal from movable heads 6 may be shifted in electrical phase in accordance with the predetermined calibrating signal fed to phase shifter 7. The shifted electrical signal is transmitted to phase comparator 8 where its phase is compared with the standard reference signal transmitted from stationary heads 5. The resulting error signal is the same as that generated by the embodiment shown in Fig. 1.

The device of Figs. 1 and 2 may be considered as a novel servo loop in which the command signal is applied to phase shifter 7, a response signal is generated in detecting devices 6 relative to the signal generated in detecting devices 5, and an error signal is generated in phase comparator 8. The error signal may then be used as a measure of response of the movement of heads 6 to the command or calibrating signal, or it may be used to drive auxiliary equipment to increase the fidelity of response of the movement of heads 6 in accordance with the command signals.

Figure 3:
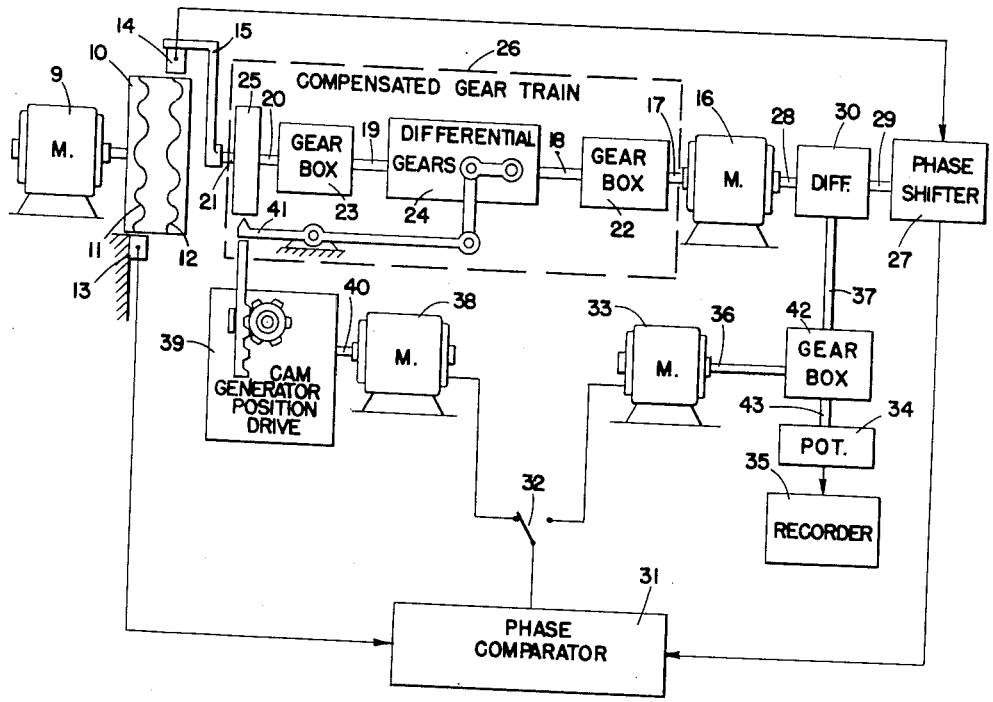
Fig. 3 is a schematic diagram of a preferred embodiment of this invention as applied to the calibration and correction of precision drives.

In Fig. 3, prime mover 9 turns rotating structure 10, such as a disc or drum, at a known substantially constant speed. Rotating structure 10 is fabricated of a material upon which magnetic signals can be impressed. To magnetic sinusoidal tracks 11 and 12, which close on themselves and are identical in every respect, are impressed upon rotating structure 10. A plurality of magnetic reading heads 13, of which only one is shown, are uniformly spaced around rotating structure 10, as shown in Fig. 7, and are separated by a distance equal to an integral multiple of the average wave length of sinusoidal track 11 so that the signal induced in each of the heads passes through zero at the same time. These heads remain stationary. A plurality of reading heads 14, of which only one is shown, are attached to rotating framework 15 and turn about rotating structure 10 relative to fixed heads 13. Heads 14 are separated by a distance equal to an integral multiple of the average wave length of track 12 so that each of the signals in heads 14 will pass through zero at approximately the same time. Rotating framework 15, shown in detail in Fig. 7, is driven by motor 16 through shafts 17, 18, 19, 20, and 21 and precision gear trains 22 and 23, as well as differential gear 24 and cam drive 25. Precision gear trains 22 and 23, differential gear 24, cam drive 25, cam generator-follower 41, and shafts 18, 19, and 20 comprise the major elements of compensated gear train 26. Magnetic heads 14 are electrically connected in series to phase shifter 27 which is mechanically driven by motor 14 through shafts 28 and 29 and differential gear 30. The electrical output of phase shifter 27 is connected to phase comparator 31. Stationary heads 13 are also electrically connected in series to phase comparator 31. The electrical output of phase comparator 31 is alternatively connected to motor 33 or motor 38 in accordance with the position of switch 32. Motor 33 is mechanically connected to potentiometer 34, and to differential gear 30 through gear box 42 and shafts 36, 37, and 43. Potentiometer 34, in turn, is electrically connected to recorder 35. Motor 38 is mechanically connected to cam generator position drive 39. Cam generator position drive 39 moves cam generator-follower 41 to generate a correction cam. Cam generator-follower 41 also acts as a cam follower and is mechanically linked to differential gear 24 to provide the necessary correction to compensate gear train 26. Thus, the combination of motor 38, cam generator position drive 39, and shaft 40 comprises a means for correcting compensated gear train 26, while the combination of motor 33, gear box 42, potentiometer 34, recorder 35, differential gear 30 and shafts 36, 37, and 43 comprises a means for recording the residual error in compensated gear train 26.

Figure 4:
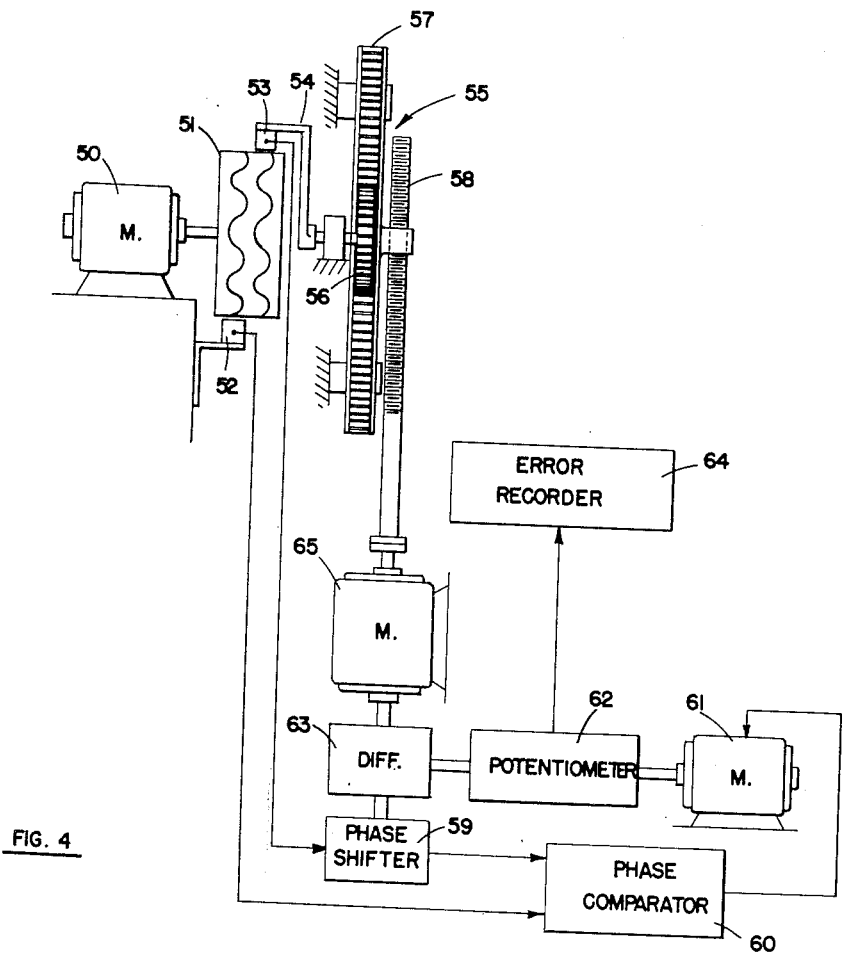
Fig. 4 is a diagram of an angle measuring device of this invention applied to the calibration and correction of a precision lead screw drive, rack gear, or master gear.

Fig. 4 shows the major structure of this invention adapted to calibrate a worm gear, master gear, or rack gear. Motor 50 drives drum 51 at a known substantially constant speed. Drum 51 has two magnetic tracks impressed upon it. A plurality of fixed magnetic heads 52 are uniformly disposed about the circumference of drum 51, as shown in Fig. 7. A plurality of movable magnetic heads 53 are also uniformly disposed about the circumference of drum 51, as shown in Fig. 7. Arm 54, shown in detail in Fig. 7, turns heads 53 about drum 51 relative to heads 52. Gear train 55 turns arm 54 and comprises master gear 56, rack gear 57, and worm gear 58. This embodiment of the invention will calibrate either master gear 56, rack gear 57, or worm gear 58, provided the two gears which are not being calibrated are initially accurate or initially calibrated. Heads 53 are electrically connected to phase shifter 59. The electrical output of phase shifter 59 is fed to phase comparator 60 where the phase of the electrical output is compared with the signal from heads 52. The electrical output from phase comparator 60 drives motor 61 which is mechanically connected to potentiometer 62 and differential gear 63. Potentiometer 62 is electrically connected to recorder 64. Motor 65 drives phase shifter 59 through differential gear 63. Motor 65 also drives gear train 55.

Figure 5:
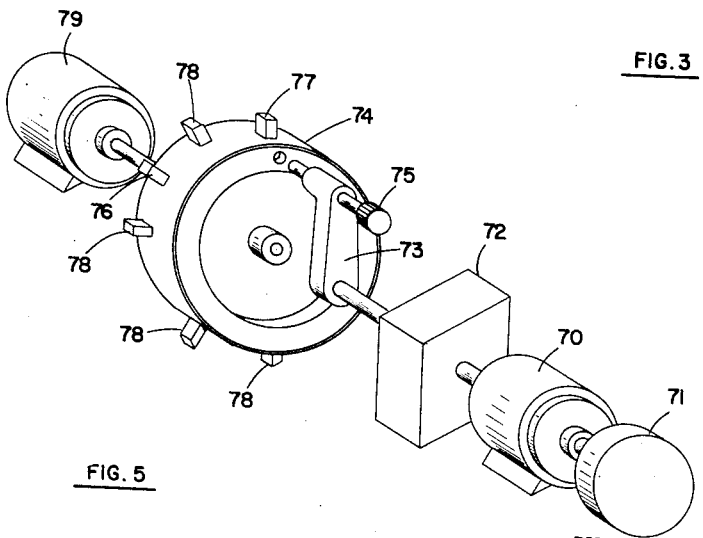
Fig. 5 is a diagram of a structure for accurately placing a sinusoidal magnetic track upon a disc or drum.

Fig. 5 illustrates the structure necessary for the process of this invention which accurately produces a smooth sinusoidal magnetic record or series of spaced indicia upon a rotating structure. Drive motor 70 mechanically drives sinusoidal voltage generator 71 and provides an input rotation to gear train 72. Gear train 72 is not necessarily a precision gear train. The mechanical output of gear train 72 drives arm 73 which mechanically engages rotating structure 74 by means of pin 75. Electrical signals from voltage generator 71 are transmitted to recording device 76, such as a magnetic head, which impresses a signal which corresponds to the voltage generated by voltage generator 71 upon rotating structure 74. The number of complete sinusoids which will be impressed upon rotating structure 74 by recording device 76 is exactly equal to the gear ratio of gear train 72. Because of errors in gear train 72, the sinusoids initially impressed upon rotating structure 74 will not be exact sinusoids nor will they be completely uniform. The sinusoids will, however, close upon themselves because one rotation of arm 73 corresponds to an exact number of rotations of motor 70 and to the generation of an exact number of sinusoids by wave generator 71. Pin 75 is next disengaged and recording device or magnetic head 76 is disconnected from voltage generator 71. Recording device 77, such as a magnetic head, is placed adjacent to rotating structure 74. A plurality of detecting devices 78, such as magnetic heads, are disposed around the axis of rotation of rotating structure 74 adjacent to the magnetic track which has been impressed upon rotating structure 74 by head 76. Motor 79 is provided to mechanically turn rotating structure 74 at a known substantially constant speed. The voltages generated in individual devices 78 are connected in series, as shown at 13 and 14 in Fig. 7. The circumferential position of devices 78 are adjusted to achieve the maximum voltage output from the set of series-connected devices. When devices 78 are adjusted to obtain a miximum voltage output, they are all separated by an integral multiple of the distance between consecutive indicia which, in the preferred embodiment, corresponds to integral multiples of the average wave length of the sinusoidal signal which was impressed upon disc or drum 74 by head 76. The output voltages of all of devices 78 are next applied in series to the input of recording device 77, whereby a sinusoidal signal is impressed upon rotating structure 74 which has the same average wave length as the original impressed signal. The magnetic track produced by device 77 is parallel to the original track produced by device 76. Because all of devices 78 are in series, the signal transmitted to device 77 will be the total signal voltage induced in devices 78 and will have an averaging effect upon the wave length of said signal. This averaging effect causes the spacing of indicia impressed upon the track produced by device 77 to be very much more uniform than the original sinusoidal track produced by device 76. In the preferred embodiment, the original sinusoidal track is next erased by a magnetic erasing means. Magnetic pick-off heads are then disposed around the circumference of disc or drum 74 adjacent to the track produced by head 77. The magnetic pick-off heads are adjusted and the signal is retransferred to the position of the original track. The process is repeated and re-repeated until two parallel, sinusoidal magnetic tracks or uniformly spaced series of indicia are impressed upon rotating structure 74 for use in this invention. Devices 76, 77, and 78 are held in a frame similar to that shown in Fig. 7.

Figure 6:
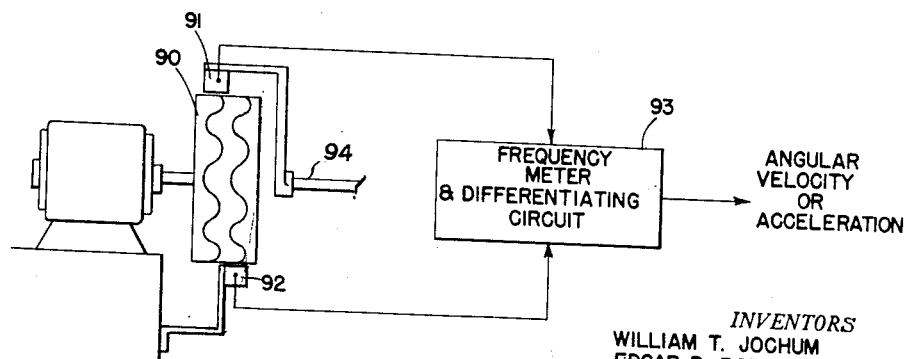
Fig. 6 is a schematic diagram of this invention to determine instantaneous angular velocity or angular acceleration of a shaft.

Fig. 6 shows a rapidly rotating structure 90 upon which two tracks of uniformly spaced indicia are placed in a circle centered upon the axis of rotation of the structure. A plurality of properly spaced movable detecting devices 91 and a plurality of properly spaced fixed detecting devices 92 are provided as described in the embodiments above. The frequency of the signal from fixed devices 92 is compared to the frequency of the signal from movable devices 91 by frequency meter 93. The difference in frequency between the two voltages represents the angular velocity of shaft 94. Frequency meter 93 converts the difference frequency function into a voltage function by conventional techniques. The resultant voltage function is electrically differentiated to obtain a voltage proportional to the angular acceleration of shaft 94.

Figs. 8, 9, and 10 show an embodiment of this invention which contemplates the use of photocells 100 and 101 as sensing devices with their associated light sources 102 and 103 and lens systems 111, 112, 113, and 114. Indicia 104 upon disc 105 comprise uniformly spaced etched or engraved transparent slits, as shown in Fig. 10. Slits 104 are arranged in two tracks 106 and 107 in which corresponding slits in each track are circumferentially aligned upon disc 105. Movable photocells 100 and lenses 111 are supported upon rotating frame 108. Movable lights 102 and lenses 113 are supported upon rotating frame 109 which is similar to frame 108. Frames 108 and 109 turn together. Stationary photocells 101, lights 103, and lenses 112 and 114 are supported by frame 110. Photocells 100 and 101, with their associated lights and lens systems, are uniformly spaced about the axis of rotation of disc 105. Disc 105 and frames 108 and 109 are driven in the same manner as the corresponding parts in Figs. 1, 2, 3, and 4 are driven. Electrical connections from photocells 100 and 101 are the same as for the corresponding sensing devices in Figs. 1, 2, 3, and 4.

In operation, sinusoidal magnetic tracks 3 and 4 upon rotating structure 2 in Figs. 1 and 2 induce voltages into magnetic heads 5 and 6. Rotating structure 2 is rotated at a known relatively constant speed by motor 1. In Fig. 1 the voltage generated in heads 5 is shifted in phase according to a calibrating signal, by phase shifter 7. Phase shifter 7 may be an electrically driven or mechanically driven phase shifter. The voltage whose phase has been shifted is applied to phase comparator 8 where its phase is compared with the phase of the voltage generated in magnetic heads 6. An error signal is produced which is proportional to the difference in phase between these two voltages. Alternatively, as shown in Fig. 2, phase comparator 8 and phase shifter 7 may exchange places in the sequence of structure without altering the character of the error signal.

The embodiment shown in Fig. 3 shifts the phase of the voltage generated in magnetic heads 14 by means of mechanically driven phase shifter 27. The phase of the resulting voltage is compared by phase comparator 31 to the phase of the voltage generated in magnetic heads 13. When a selection is made by switch 32, the error signal from phase comparator 31 is used to drive either motor 33 or motor 38.

When motor 33 is driven by the error signal from phase comparator 31, a correction is introduced into shaft 29 by differential gear 30. Shaft 29 controls phase shifter 27 which corrects the phase of the signal from phase shifter 27 in a direction to place this signal in phase with the signal generated in stationary heads 13. A change in current in potentiometer 34, due to the change of resistance of potentiometer 34 with shaft rotation of shafts 36 and 43, causes the amount of shaft rotation of shafts 36 and 43 to be recorded on recorder 35.

When motor 38 is driven by the error signal from phase comparator 31, cam generator position drive 39 positions cam generator-follower 41 to generate a correction contour upon a cam driven by cam drive 25

Simultaneously, differential gear 24 introduces a correction into shaft 18 which causes the phase of the voltage from phase shifter 27 to be in phase with the voltage generated in stationary heads 13. After the cam driven by cam drive 25 has had generated thereon a correction contour, cam generator position drive 39 is disconnected and cam generator-follower 41 operates as a cam follower. Cam generator-follower 41 introduces the proper correction into compensated gear train 26 by means of differential gear 24. The entire assembly of cam 25, precision gears 22 and 23, together with differential gear 24 and shafts 18, 19, and 20, and cam generator-follower 41 form a compensated gear train. The cam may be of the phonograph record type and cam generator-follower 41 of the stylus type. Obviously, other conventional precision cam devices could be used. Compensated gear train 26 may be removed as a unit for operation in other devices.

As shown in Fig. 4, precision gear train 55, to be calibrated, may comprise a master gear together with a rack gear and a worm gear. Master gear 56 may be calibrated if rack gear 57 and worm gear 58 are accurate. Rack gear 57 may be calibrated if master gear 56 and worm gear 58 are accurate or the error characteristics thereof are known. Worm gear 58 may be calibrated if master gear 56 and rack gear 57 are accurate or the error characteristics thereof are known. The process of placing a pair of accurate parallel sinusoidal tracks upon a rotating structure, as shown in Fig. 5, has been described above.

The invention is intended to include a rapidly rotating structure upon which a track of uniformly spaced indicia has been impressed, a series of detecting means which remain stationary with respect to the structure and a series of detecting means which rotate about the rotating structure relative to the stationary detecting means. The signal from the stationary detecting means can then be changed in phase in accordance with a calibrated signal and the phase of the signal so changed compared to the signal received from the rotated detecting means. Electronic smoothing circuits may be used to smooth the signal detected by both the stationary and rotated detecting means to provide a sinusoid of the fundamental frequency generated by the series of spaced indicia. Thus, photoelectric means, as shown at 100 and 101 in Figs. 8, 9, and 10, may be used as detecting means together with a series of uniformly spaced etched transparent slits 107 behind which light sources 102 and 103 have been placed with the proper lenses 111, 112, 113, and 114. Other compensating devices, such as thermal compensating devices and anti-backlash devices, may be used in conjunction with this invention to increase its accuracy. For very accurate work the gear ratio of the gear train to be measured must be kept high which may make it necessary to introduce precision calibrated gears.

This invention provides a quick, easy means for calibrating a gear train, dividing head, telescope pointer, and other similar devices which require accurate angular measurement. The order of accuracy which this invention achieves is greater than that achieved by conventional means and saves tedious work and supervision. Less expensive gears may be used for precision gear trains by meshing them in such a manner that the errors in the individual gears may be made to become compensating as the result of analyzing the performance of the gears by means of this invention.

Although the invention has been described and illustrated in detail, it is to be clearly understood that the same is by way of illustration and example only and is not to be taken by way of limitation, the spirit and scope of this invention being limited only by the terms of the appended claims.

We claim:
1. Means for placing a self-closing sinusoidal magnetic track upon a rotatable magnetizable structure at a constant radius from the axis of rotation of said structure, comprising a stationary magnetic recording head adjacent to said structure, a prime mover, a gear train mechanically connected between said structure and said prime mover, and a sine wave voltage generator mechanically connected to said prime mover, the electrical voltage generated by said generator being connected to said recording head, whereby a number of uniformly spaced sine waves equal in number to an integral multiple of the gear ratio of said gear train are impressed upon said structure.

2. Means for determining the angle through which a shaft has turned, comprising a rapidly rotating structure whose axis is coaxial with the axis of said shaft and which has a sequence of uniformly spaced indicia in a circular track upon said structure symmetrical about said axis, a plurality of fixed detecting devices and a plurality of movable detecting devices spaced about the circumference of said track, mechanical means attached between said shaft and said movable devices for causing said movable devices to turn about said track with the rotation of said shaft, said fixed devices being separated and said movable devices being separated by distances equal to an integral multiple of the average distance between consecutive indicia, a phase comparator and a phase shifter, said phase shifter being electrically connected to said fixed devices, said phase comparator being electrically connected to said movable devices and to said phase shifter, whereby a calibrating signal introduced into said phase shifter in accordance with a predetermined calibration of the proper position of said shaft will shift the phase of the signal from said fixed devices, and the output from said phase comparator will show the error in position of said shaft.

3. A device as recited in claim 2 in which said rapidly rotating structure is a disc, said uniformly spaced indicia are transparent slits, and said detecting devices are photocells with a light and a lens system associated with each said photocell.

4. Means for determining the angle through which a shaft has turned, comprising a rapidly rotating structure whose axis is coaxial with the axis of said shaft and which has a sequence of uniformly spaced indicia in a circular track upon said structure symmetrical about said axis, a plurality of fixed detecting devices and a plurality of movable detecting devices spaced about the circumference of said track, mechanical means attached between said shaft and said movable devices for causing said movable devices to turn about said track with the rotation of said shaft, said fixed devices being separated and said movable devices being separated by distances equal to an integral multiple of the average distance between consecutive indicia, a phase comparator and a phase shifter, said phase shifter being electrically connected to said movable devices, said phase comparator being electrically connected to said fixed devices and to said phase shifter, whereby a calibrating signal introduced into said phase shifter in accordance with a predetermined calibration of the proper position of said shaft will shift the phase of the signal from said movable devices, and the output from said phase comparator will show the error in position of said shaft.

5. A device as recited in claim 4 in which said rapidly rotating structure is a disc, said uniformly spaced indicia are transparent slits, and said detecting devices are photocells with a light and a lens system associated with each said photocell.

6. Means for determining the error in a gear train, comprising a rapidly rotating structure coaxial with the output shaft of said gear train and having a uniform sinusoidal magnetic track symmetrical about the axis of rotation of said structure, a plurality of fixed magnetic heads, a plurality of movable magnetic heads attached to said output shaft, said fixed heads being separated and said movable heads being separated by a distance equal to an integral multiple of an average wave length of said sinusoidal track, a mechanically driven electrical phase shifter, a prime mover for driving said gear train and said phase shifter in synchronism, a differential gear between said prime mover and said phase shifter to introduce correction into said phase shifter, a motor mechanically connected to said differential gear, recording means attached to said motor to record the shaft rotation of said motor, a phase comparator electrically connected to said motor, one said plurality of heads being electrically connected to said phase shifter, the other said plurality of heads being electrically connected to said phase comparator, said phase comparator being electrically connected to said phase shifter, whereby an error in rotation of said output shaft of said gear train causes an error in the voltage phase difference between said fixed and said movable heads, said phase shifter shifts the phase of one of the voltages in accordance with the angle through which said gear train output shaft should have turned, the difference in phase between the voltages applied to said phase comparator drives said motor and causes the setting of said phase shifter to change and place the two voltages applied to said phase comparator in phase, and the record of the rotation of said motor is recorded as the error in said gear train.

7. Means for permanently correcting a precision gear train, comprising a rapidly rotating drum of magnetizable material having two identical self-closing sinusoidal magnetic parallel tracks impressed upon the periphery of said drum, a plurality of series-connected fixed magnetic reading heads spaced about the periphery of said drum adjacent to the first said magnetic track, said fixed heads being separated by a distance equal to an integral multiple of the average wave length of said first sinusoidal track, a plurality of series-connected movable magnetic reading heads spaced about the periphery of said drum adjacent to the second said magnetic track, said movable heads being separated by a distance equal to an integral multiple of the average wave length of said second sinusoidal track, support means for said movable heads which are movable along the periphery of said drum and whose axis of rotation coincides with the axis of rotation of said drum, said support means being attached to the output of said gear train, an electrical phase shifter, a prime mover, shaft-connected to drive said precision gear train and said phase shifter, a phase comparator, said movable heads being electrically connected to said phase comparator through said phase shifter, said fixed heads being electrically attached to said phase comparator, a motor, a cam generator drive driven by said motor, said motor being electrically supplied from said phase comparator, a cam and a differential gear together with a combination cam generator-follower, said cam generator drive causing said cam generator-follower to produce a proper correction contour upon said cam, said cam generator-follower, positioned upon said cam, mechanically linked to said differential gear whereby a correction is introduced in the mechanical rotation of said phase shifter to cause the voltage from said phase shifter to said phase comparator to be in phase with the voltage generated by said fixed heads, thus completely compensating and correcting said gear train.

8. A device as set forth in claim 7 in which said cam is a disc having a circular groove at a constant radius about the axis of said disc and said cam generator-follower is a stylus positioned within said groove whereby the movements of said stylus operate said differential gear train.

9. Means for permanently correcting a precision gear train comprising a rapidly rotating disc of magnetizable material having two identical self-closing sinusoidal magnetic parallel tracks impressed upon the surface of said disc, a plurality of series-connected fixed magnetic reading heads spaced about a circle adjacent to the first said magnetic track, said fixed heads being separated by a distance equal to an integral multiple of the average wave length of said sinusoidal track, a plurality of series-connected movable magnetic reading heads spaced about a circle adjacent to the second said magnetic track, said movable heads being separated by a distance equal to an integral multiple of the average wave length of said second sinusoidal track, support means for said movable heads which are rotatable about said disc and whose axis of rotation coincides with the axis of rotation of said disc, said support means being attached to the output of said gear train, an electrical phase shifter, a prime mover, shaft-connected to drive said precision gear train and said phase shifter, a phase comparator, said movable heads being electrically connected to said phase comparator through said phase shifter, said fixed heads also being electrically attached to said phase comparator, a motor, a cam generator drive driven by said motor, said motor being electrically supplied from said phase comparator, a cam and a differential gear together with a combination cam generator-follower, said cam generator drive causing said cam generator-follower to produce a proper correction contour upon said cam, said cam generator-follower, positioned upon said cam, mechanically linked to said differential gear whereby a correction is introduced in the mechanical rotation of said phase shifter to cause the voltage from said phase shifter to said phase comparator to be in phase with the voltage generated by said fixed heads, thus completely compensating and correcting said gear train.

10. Means for measuring the angular velocity of a shaft, comprising a rotating structure carrying a track of uniformly distributed indicia symmetrical about the axis of said structure, a plurality of fixed and a plurality of movable detecting means adjacent to said track and each separated by a distance equal to an integral multiple of the distance between consecutive indicia, said movable detecting devices connected to said shaft to turn therewith about said track, frequency measuring means attached to said movable and said fixed heads whereby the beat frequency between the signal generated in said movable heads and the signal generated in said fixed heads is measured and is proportional to the angular velocity of said shaft.

11. Means for placing a self-closing sinusoidal magnetic track upon a rotating magnetizable structure at a constant radius from the axis of rotation of said structure comprising a stationary magnetic recording head adjacent to said structure, a shaft, means for rotating said shaft, means connected between said shaft and said structure to drive said structure 360° about its axis while said shaft rotates an integral multiple of 360° about its axis, a sine wave voltage generator mechanically connected to be driven by said shaft to generate an integral number of complete sine waves for each rotation of said structure, the electrical voltage generated by said generator being connected to said recording head, whereby an integral number of uniformly spaced sine waves are impressed upon said structure.

12. Means for placing a series of uniformly spaced magnetic indicia upon a rotatable magnetizable structure at a constant radius from the axis of rotation of said structure comprising a stationary magnetic recording head adjacent to said structure at said constant radius from said axis, a shaft, means for rotating said shaft, means connected between said structure and said shaft to drive said structure through an angle of 360° about its axis while said shaft simultaneously turns through an integral multiple of 360°, electrical generating means connected to be driven by said shaft, said generating means generating a voltage which is a periodic function of the rotation of said shaft, the voltage generated by said generating means being connected to said recording head, whereby an integral number of uniformly spaced magnetic indicia are impressed upon said structure at said constant radius from said axis of rotation.

13. Means for transcribing and increasing the uniformity of a series of spaced indicia upon a track symmetrically disposed at a constant radius about the axis of rotation of a rotatable structure comprising means for rapidly rotating said structure, a plurality of stationary indicia detecting devices which have an electrical output, positioned about said first track and separated by a distance equal to an integral multiple of the average separation of said indicia, a single stationary indicia recording device adjacent said structure but not adjacent said first track, the total electrical output of all said detecting devices being connected to the input of said single stationary indicia recording device whereby said indicia upon said first track are placed upon a second track more uniformly, symmetrically and precisely than the indicia upon said first track, the errors in uniformity in the spacing of indicia upon said first track being arithmetically averaged by said plurality of detecting devices associated with said first track.

14. Means for transcribing and increasing the uniformity of a self-closing sinusoidal magnetic track disposed at a constant radius from the axis of rotation of a rotatable structure comprising means for rapidly rotating said structure, a plurality of stationary magnetic reading heads disposed about said first magnetic track and separated by a distance equal to an integral multiple of the average wave length of said sinusoidal track, a single stationary magnetic recording head positioned adjacent said structure, the electrical output of said reading heads being connected in series to the input of said recording head whereby said first sinusoidal track is transferred to a second self-closing sinusoidal magnetic track upon said structure which is more uniform, symmetrical, said precise than said first track, the errors in uniformity of the wave length of said first track being arithmetically averaged by said plurality of reading heads associated with said first track.

15. A servo system comprising a rapidly rotating structure having a series of uniformly spaced indicia circumferentially arranged at a constant radius about the axis of rotation thereof, a plurality of fixed and a plurality of movable indicia detecting devices positioned adjacent said indicia to detect the movement of said indicia and spaced apart by a distance which is an integral multiple of the average distance between consecutive indicia, one of the average distance between consecutive indicia, one input to said servo system being connected to move said movable detecting devices, a phase shifter, the electrical output of one said set of heads being connected to the input of said phase shifter, a phase comparator, the output of the other said set of indicia detecting devices being connected to the input of said phase comparator, a second input to said servo system being connected to said phase shifter to shift the phase of the electrical signal from said first set of indicia detecting devices, the output of said phase shifter being connected to the input of said phase comparator, whereby when a common signal is placed into said one input of said servo system, and when the response of a controlled member is placed into the other said input of said servo system, the output of said phase comparator is an electrical signal which corresponds to the error in said servo system.

References Cited in the file of this patent

UNITED STATES PATENTS

| | | |
|---|---|---|
| 1,561,452 | Alden | Nov. 17, 1925 |
| 1,878,658 | Aronoff | Sept. 20, 1932 |
| 2,166,833 | Wilfart | July 18, 1939 |
| 2,168,965 | Trachsel | Aug. 8, 1939 |
| 2,243,547 | Weisse | May 27, 1941 |
| 2,251,973 | Beale et al. | Aug. 12, 1941 |
| 2,261,321 | Williams | Nov. 4, 1941 |
| 2,275,977 | Means et al. | Mar. 10, 1942 |
| 2,355,128 | Whitlock | Aug. 8, 1944 |
| 2,356,991 | Gibbs et al. | Aug. 29, 1944 |
| 2,369,622 | Toulon | Feb. 13, 1945 |
| 2,370,134 | Begun | Feb. 27, 1945 |
| 2,370,176 | Kornei | Feb. 27, 1945 |
| 2,370,692 | Shepherd | Mar. 6, 1945 |
| 2,395,127 | Kornei | Feb. 19, 1946 |
| 2,427,421 | Rieber | Sept. 16, 1947 |
| 2,447,208 | Rendel | Aug. 17, 1948 |
| 2,475,742 | Hammond | July 12, 1949 |
| 2,508,547 | Slonczewski | May 23, 1950 |
| 2,513,367 | Scott | July 4, 1950 |
| 2,516,748 | Boice | July 25, 1950 |
| 2,602,837 | Foster et al. | July 8, 1952 |
| 2,634,604 | Hope | Apr. 14, 1953 |
| 2,680,241 | Gridley | June 1, 1954 |

OTHER REFERENCES

Pages 100–101 of May 1950 issue of Electronics Magazine 73–1.